US012654956B2

(12) United States Patent (10) Patent No.: US 12,654,956 B2

Heng (45) Date of Patent: Jun. 16, 2026

(54) SOLAR MODULE SPACER

(71) Applicant: REC Solar PTE. Ltd., Singapore (SG)

(72) Inventor: Fook Hai Heng, Singapore (SG)

(73) Assignee: REC Solar PTE. Ltd., Singapore (SG)

( * ) Notice: Subject to any disclaimer, the term of this patent is extended or adjusted under 35 U.S.C. 154(b) by 19 days.

(21) Appl. No.: 18/725,014

(22) PCT Filed: Dec. 9, 2022

(86) PCT No.: PCT/EP2022/085150

§ 371 (c)(1),
(2) Date: Jun. 27, 2024

(87) PCT Pub. No.: WO2023/126148

PCT Pub. Date: Jul. 6, 2023

(65) Prior Publication Data

US 2025/0066144 A1 Feb. 27, 2025

(30) Foreign Application Priority Data

Dec. 29, 2021 (GB) ...................................... 2119062

(51) Int. Cl.
B65G 57/00 (2006.01)
B65D 57/00 (2006.01)
(Continued)

(52) U.S. Cl.
CPC ......... B65G 57/005 (2013.01); B65D 57/003 (2020.05); B65D 85/48 (2013.01); H02S 30/10 (2014.12)

(58) Field of Classification Search
CPC .. B65D 57/005; B65D 81/051; B65D 81/053; B65D 85/48; B65G 7/005; B65G 57/003;
(Continued)

(56) References Cited

U.S. PATENT DOCUMENTS 8,905,234 B2 * 12/2014 Yoshida ............... B65D 81/057
206/509
9,669,985 B1 * 6/2017 Hudson ................ B65D 81/054
(Continued)

FOREIGN PATENT DOCUMENTS

AU 2010100594 A4 7/2010
DE 4447127 A1 3/1996
(Continued)

OTHER PUBLICATIONS

Stack Pallet with Corner Support Pieces (Year: 2020).*
(Continued)

*Primary Examiner* — Bryon P Gehman
(74) *Attorney, Agent, or Firm* — Lee & Hayes, P.C.

(57) ABSTRACT

A spacer (100) for spacing two adjacent stacked solar modules (101*a*, 101*b*), the spacer (100) comprising: a body (108) having spaced opposed first and second edges (110, 109), the body (108) comprising an upper contact surface (111) for contact with an upper solar module (101*a*), and a lower contact surface (112) for contact with a lower solar module (101*b*); a first upper protrusion (114) arranged to bear against a frame (102) of the upper solar module (101*a*), the first upper protrusion (114) protruding upwardly from or proximate to the first edge (110) of the body (108) to a free end of the first upper protrusion (114); and a first lower protrusion (118) arranged to bear against a frame (102) of the lower solar module (101*b*), the first lower protrusion (118) protruding downwardly from or proximate to the first edge (110) of the body to a free end of the first lower protrusion (118), the first lower protrusion (118) offset from the first upper protrusion (114) in a direction along the first edge (110).

24 Claims, 3 Drawing Sheets

(51) Int. Cl.
    B65D 85/48       (2006.01)
    *H02S 30/10*       (2014.01)

(58) Field of Classification Search
    CPC ....... B65G 57/005; B65G 57/02; F24S 80/00;
          F24S 2025/013; H02S 20/23; H02S 30/10
    USPC ................................................ 206/585–594
    See application file for complete search history.

(56)             References Cited

U.S. PATENT DOCUMENTS

| | | | | |
|---|---|---|---|---|
| 2006/0005875 A1* | 1/2006 | Haberlein | ............... | F24S 80/00 |
| | | | | 136/251 |
| 2014/0367305 A1* | 12/2014 | Mizuo | .................... | B65D 19/44 |
| | | | | 206/585 |
| 2016/0122120 A1* | 5/2016 | Suzuki | ................... | B65D 65/10 |
| | | | | 206/701 |

FOREIGN PATENT DOCUMENTS

| | | | |
|---|---|---|---|
| DE | 202005018965 U1 | 3/2006 | |
| DE | 102008012774 B4 | 3/2014 | |
| EP | 1617485 A | 1/2006 | |
| EP | 2707659 A1 | 3/2014 | |
| JP | 2013139298 A | 7/2013 | |
| JP | 2014019486 A | 2/2014 | |
| JP | 2018083641 A | 5/2018 | |
| JP | 6363395 B2 | 7/2018 | |
| KR | 20130001566 U | 3/2013 | |
| KR | 102203574 B1 | 2/2016 | |
| KR | 2020016546 A * | 2/2020 | ............ B65D 85/48 |
| WO | WO9747526 A1 | 12/1997 | |
| WO | WO2012155872 A1 | 11/2012 | |

OTHER PUBLICATIONS

Solar Cell Panel Stacking Pallet (Year: 2020).*
GB Search Report for GB Application No. GB2119062.4, mailed on Jun. 24, 2022, 4 pages.
Search Report and Written Opinion for International Application No. PCT/EP2022/085150, mailed on Mar. 30, 2023, 15 pages.

* cited by examiner

SOLAR MODULE SPACER

CROSS-REFERENCE TO RELATED APPLICATIONS

This application is a U.S. National Phase Patent Application based on International Patent Application No. PCT/EP2022/085150, filed Dec. 9, 2022; which claims priority to GB Patent Application No. 2119062.4, filed Dec. 29, 2021. The above referenced applications are incorporated herein by reference in their entirety as if fully set forth herein.

FIELD OF THE DISCLOSURE

The present disclosure relates to spacers for spacing adjacent stacked solar modules. Such spacers may find particular, but not exclusive, use in the transportation of solar modules.

BACKGROUND

Solar modules for providing electrical energy from sunlight typically comprise an array of solar cells arranged between a backing layer and a front protective glass layer. A frame is typically provided which extends about a rectangular periphery of the backing and glass layers. The rectangular frame, which is commonly formed of extruded sections, protects the solar cells and facilitates mounting of the solar module to a structure such as the roof of a building.

Solar modules are typically transported (e.g. to site or between various distribution facilities) in containers (such as boxes) that contain several solar modules arranged in a stack. The solar modules may be stacked one on top of another in a vertical direction (i.e. with each solar module extending on a generally horizontal plane) or can be stacked in a horizontal direction (i.e. with each solar module extending on a generally vertical plane). In either case, it is known to provide spacers between each pair of adjacent modules to prevent the solar modules coming into contact during transportation, which could otherwise result in damage.

Thus, packaging the solar modules involves an operator placing several spacers about the periphery of each solar module, before positioning a further solar module against or on top of the spacers. This is time consuming and can result in operator fatigue, and there is therefore a tendency for operators to misalign spacers and/or inadvertently omit spacers when packaging solar modules. This, in turn, results in inadequate packaging of the solar modules and a higher likelihood of damage during transportation.

There is a need to ameliorate at least one of the issues discussed above with respect to solar module packaging.

SUMMARY

According to a first aspect there is provided a spacer for spacing two adjacent stacked solar modules, the spacer comprising:

a body having spaced opposed first and second edges, the body comprising an upper contact surface for contact with an upper solar module, and a lower contact surface for contact with a lower solar module;

an upper protrusion (e.g. first upper protrusion) arranged to bear against a frame of the upper solar module, the upper protrusion protruding upwardly from or proximate to the first edge of the body to a free end; and a lower protrusion (e.g. first lower protrusion) arranged to bear against a frame of the lower solar module, the lower protrusion protruding downwardly from or proximate to the first edge of the body to a free end, the lower protrusion offset from the upper protrusion in a direction along the first edge.

The offset arrangement of the lower protrusion(s) and the upper protrusions(s) avoids interference between the first lower protrusion(s) and the upper protrusion(s) of a like-spacer when the spacer is stacked on top of a like-spacer, for example, before the spacers are combined with solar modules. Thus, this arrangement facilitates stacking of the spacer with a plurality of like-spacers, for example, before the spacers are combined with solar modules. The ability to stack the spacer with like-spacers provides for more efficient storage of the stacked spacers. It also facilitates use of the spacer in an automated solar module stacking process. For example, the stackability of the spacer may permit the spacer to be loaded into a feeder device (e.g. a vibratory bowl feeder) for feeding the spacer to a handling device (e.g. an X-Y handler) for automated placement of the spacer on a solar module. By facilitating placement in an automated (machine-driven) manner, the spacer enables a packaging process that has a reduced rate of misaligned or omitted spacers.

Further, the arrangement of the protrusions (e.g. that they extend to free ends) is such that the spacer can be placed by lowering the spacer onto a solar module rather than e.g. having to push the spacer laterally onto a frame of a solar module. Again, this facilitates automation of the positioning of the spacer.

For the avoidance of doubt, it is not necessary that the entirety of the upper protrusion bear against the frame (in use). As may be appreciated, in embodiments (discussed further below) where the upper protrusion comprises a sloped inwardly facing surface, only a portion (and, in some cases, only a very small portion) may bear against the frame. In general, the role of the upper protrusion is to restrict movement of the frame in at least one direction.

Further, and as is also discussed below, it should be appreciated that the first and second edges are not restricted to being linear (e.g. each edge may extend around a corner so as to have two joined perpendicular portions).

Optional features will now be set out. These are applicable singly or in any combination with any aspect.

The lower protrusion may be a first lower protrusion and the spacer may comprise a second lower protrusion protruding downwardly from the body to a free end. The second lower protrusion may be spaced from the first lower protrusion in a direction towards the second edge of the body such that a space is defined between the first and second lower protrusions for receipt of a frame of the lower solar module.

As should be appreciated, the provision of the spaced lower and upper protrusions means that (with the use of several spacers) the upper solar module can be interlocked with respect to the lower solar module. This interlocking of the upper and lower solar modules by the spacer restricts relative movement between the solar modules in a plane that is parallel to the solar modules. This ensures that, for example, during transportation, the solar modules remain aligned with one another to form a vertically extending stack of solar modules. Without such interlocking, sudden movement (such as emergency braking by a vehicle transporting the solar modules) could result in an uneven stack of solar modules (which makes unloading/loading challenging).

Each of the first and second lower protrusions may comprise an inwardly facing surface (for bearing against a solar module frame when received in the space therebetween). At least one of the inwardly facing surfaces (e.g.

each inwardly facing surface) may be in the form of a guide surface configured to guide a solar module frame into the space defined between the first and second lower protrusions. The guide surface may be sloped in a downward and outward direction (i.e. so as to be sloped relative to a vertical axis) from the body. The guide surface may be obliquely arranged with respect to the lower contact surface.

The space defined between the first and second lower protrusions may be in the form of a channel (having a lower opening). Thus, the guide surface may be configured to guide a frame of the lower solar module into the channel. The lower contact surface may define a base of the channel (i.e. an upper side of the channel). The channel may be wider (in a direction extending between the first and second edges) at its opening than at its base. Thus, the channel may taper inwardly in an upward direction.

The term "inwardly" as used herein (at least with reference to features of the spacer) is intended to mean a direction towards a centre of the spacer (i.e. towards a centre-line extending centrally between the first and second edges of the body). The term "outwardly" is, accordingly, used to describe a direction away from a centre of the spacer.

Providing a guide surface may facilitate receipt of a portion of the frame of a solar module between the first and second lower protrusions. As noted above, the sloped surface(s) may guide the frame into the channel defined between the lower protrusions. This may accommodate some initial misalignment between the spacer and a frame when positioning the spacer on the frame, while still maintaining accuracy of the final positioning of the spacer on the frame. This, in turn, may allow for increased tolerance in the initial positioning of the spacer, thus enabling such positioning to be performed in an automated manner (e.g. by an automated handling device).

The spacer may be configured such that, when stacked with a plurality of like-spacers, the spacers form an organised vertical stack of spacers (i.e. the stack extending along a linear vertical path with all of the spacers having the same orientation and stacked directly one on top of another).

The spacer may comprise a recess arranged to accommodate an upper protrusion or a first lower protrusion of a like-spacer when the spacer is stacked with (i.e. on top of or below) a like-spacer.

Thus, the recess may be vertically aligned with (i.e. directly below/above) the upper protrusion or the first lower protrusion. That is, when the recess is arranged to accommodate the upper protrusion of the like-spacer, the recess is vertically aligned below an upper protrusion of the spacer, and when the recess is arranged to accommodate a first lower protrusion of the like-spacer, the recess is vertically aligned above the first low protrusion of spacer.

The recess may have a shape that complements the shape of the upper protrusion or the first lower protrusion (i.e. the protrusion which it is configured to accommodate). The recess may taper inwardly in a direction of receipt of the protrusion of the like-spacer in use. Thus, the recess may be wider (in a direction along the first edge) at an open end thereof than an opposite distal (closed) end thereof. The recess may have a trapezoidal cross-sectional shape (taken in a direction along the first edge).

The upper protrusion and/or the first lower protrusion may taper inwardly from a proximal end (at which it is connected to the body) to its free (distal) end. The proximal end of the upper protrusion and/or the first lower protrusion may be wider (in a direction along the first edge) than the distal end.

The upper protrusion and/or the first lower protrusion may have a trapezoidal cross-sectional shape (taken in a direction along the first edge).

The tapered nature of the recess and corresponding upper protrusion or first lower protrusion may facilitate insertion of the protrusion of a like-spacer into the recess when the spacer is stacked with the like-spacer. That is, the tapering may allow the spacer to self-align with the like-spacer as it is stacked thereon.

The recess may be at least partly defined by (e.g. a side portion of the recess may be defined by) the upper protrusion or the first lower protrusion (i.e. the protrusion which it is not configured to accommodate).

The spacer may comprise two upper protrusions and the recess may be defined between the two upper protrusions. The spacer may comprise two first lower protrusions and the recess may be defined between the two first lower protrusions.

The spacer may comprise a plurality of first lower protrusions (each may be as described above) spaced in a direction along the first edge of the body. Recesses (e.g. each being as described above) may be defined between adjacent pairs of first lower protrusions.

The spacer may comprise a plurality of upper protrusions (each as described above) spaced along the first edge. Recesses (e.g. each being as described above) may be defined between adjacent pairs of upper protrusions.

In other words, the spacer may comprise one or more upper protrusions and one or more first lower protrusions and each of the one or more first lower protrusions may be offset in a direction along the first edge from each of the one or more upper protrusions.

Each pair of adjacent upper protrusions may be vertically aligned with (i.e. directly above) a corresponding recess defined between a pair of first lower protrusions. Each pair of adjacent first lower protrusions may be aligned with (i.e. directly below) a corresponding recess defined between a pair of upper protrusions. In this way, each upper protrusion may be offset from each first lower protrusion along the first edge.

Accordingly, the first edge of the body of the spacer may comprise a plurality of upper protrusions and a plurality of first lower protrusions that are arranged in an alternating pattern along the first edge (e.g. forming a corrugated shape). In this way, upon stacking of the spacer on top of a like-spacer, the first lower protrusions may interdigitate with the upper protrusions of the like-spacer. This may provide a particularly secure connection between the two spacers when stacked.

The height of the or each first lower protrusion (e.g. from the lower contact surface) may be substantially the same as the height of the second lower protrusion.

The second lower protrusion may be elongate in a direction along (i.e. parallel to) the second edge of the body. The second lower protrusion may extend along a substantial portion (e.g. the entirety) of the body in the direction of the second edge. In this respect, the second lower protrusion may be in the form of a rib, lip or flange of the body. The second lower protrusion may protrude (e.g. downwardly) from or proximate to the second edge.

The second lower protrusion may be hollow. Thus, the second lower protrusion may comprise a cavity, which may be open at an upper end thereof (i.e. an open-topped cavity). A wall of the second lower protrusion may surround (and thus define) the cavity. The cavity may extend along an elongate axis of the second lower protrusion. The second lower protrusion may comprise dividing walls extending transversely to the elongate axis (and/or in a direction between the first and second edges) that divide the cavity into separated cavity portions. The wall surrounding the cavity and/or the dividing walls may provide means for gripping the spacer by a handling device.

The or each first lower protrusion may be hollow. The or each first lower protrusion may comprise a cavity, which may be open at an upper end thereof (i.e. an open-topped cavity). A wall of the or each first lower protrusion may surround (and thus define) the cavity. Again, the wall surrounding the cavity may provide means for gripping the spacer by a handling device.

The spacer may comprise an aperture for fluid flow therethrough from above the spacer to below the spacer. The aperture may be formed so as to extend through the or each first and/or second lower protrusion. Thus, for example, when the or each first or second lower protrusion comprises a cavity, the aperture may be arranged to provide fluid flow from the cavity. Thus, the aperture may be formed at a lower end of the cavity (at the free end of the protrusion). When the second lower protrusion comprises dividing walls, an aperture may be provided at the lower end of each cavity portion. Each of the first and second lower protrusions may comprise an aperture formed therein (e.g. at the free end thereof). The or each aperture may have a diameter of between 0.5 and 3 mm, e.g. between 0.7 and 1.5 mm, e.g. about 1.2 mm.

The or each aperture may permit water to flow through the spacer (e.g. to prevent water collecting on or in portions of the spacer). Alternatively or additionally, the aperture may help to prevent a vacuum being formed between the spacer and a like-spacer when stacked on top of one another. This may facilitate use of the spacer with a handling device (because it allows the handling device to more easily remove a single spacer from a stack of spacers).

The or each upper protrusion may be a first upper protrusion and the spacer may further comprise a second upper protrusion. The second upper protrusion may be spaced from the first upper protrusion (or at least one first upper protrusion, in the case where a plurality of first upper protrusions are provided) in a direction towards the second edge. In this way, the first and second upper protrusions may define a space therebetween for receipt of a frame of the upper solar module.

Each of the first and second upper protrusions may comprise an inwardly facing surface (i.e. facing the other of the upper protrusions). At least one of the inwardly facing surfaces (e.g. both) may be in the form of a guide surface configured to guide the frame of the upper module into the space between the first and second upper protrusions. The guide surface may be sloped in an upwardly and outwardly direction. The guide surface may be obliquely arranged with respect to the upper contact surface.

The second upper protrusion may be spaced inwardly from the second edge. The spacing between the first and second upper protrusions may be less than the spacing between the first and second lower protrusions.

The second upper protrusion may be boxed shape (may be substantially cuboid). The height of the second upper protrusion (e.g. from the upper contact surface) may be smaller than the height of the first upper protrusion. The second upper protrusion may be configured such that, in use, an outer glass layer of the upper solar module is supported thereon.

The spacer may comprise a plurality of second upper protrusions (each may be as described above). The second upper protrusions may be spaced along a path that is substantially parallel to one or both of the first and second edges. The provision of a plurality of second upper protrusions may spread the force applied to the upper solar module (e.g. the glass layer of the upper solar module).

The body may be substantially planar. The body may extend horizontally. The upper and/or lower contact surfaces may be planar. The upper and/or lower contact surfaces may extend horizontally.

The spacer may be integrally formed (i.e. may be a unitary piece). The spacer may be formed by injection moulding. The spacer may comprise a plastic material. The spacer may comprise high-density polyethylene (HDPE) resin.

The spacer may be configured for receipt between a linear portion of a frame of the upper solar cell module and a linear portion of a frame of the lower solar cell module. That is, the spacer may be configured for spacing two edge portions (as opposed to corner portions) of two respective solar cell module frames. In such embodiments, each of the first and second edges may be linear (and parallel). Similarly, the channel defined by the first and second lower protrusions may extend along a linear path, and the space defined by the first and second upper protrusions may extend along a linear path.

In other embodiments, the spacer may be configured for receipt between a corner portion of a frame of the upper solar cell module and a corner portion of a frame of the lower solar cell module. In this respect, the spacer may be referred to as a "corner spacer". In such embodiments the first and second edges may extend along a path that follows the shape of a corner. Thus, each of the first and second edges may comprise first and second joined portions that are substantially perpendicular to one another.

In other words (and for the avoidance of doubt) references above to a first or second edge are intended to encompass an edge that is non-linear (e.g. that extends around a corner and that may include two joined perpendicular edge portions).

In such embodiments, the channel (defined between the first and second lower protrusions) may thus follow a corner path (i.e. having first and second joined portions that are substantially perpendicular to one another). Likewise, the first and second upper protrusions may define a space that follows a corner path.

The first edge may be an in-use peripheral edge of the spacer (i.e. disposed at the periphery of the solar modules in-use). Thus, the first upper and lower protrusions may be configured to bear against outer surfaces of the frames of the respective solar modules.

The second edge may be an in-use internal edge of the spacer (i.e. disposed on an internal side of the frames of the solar modules in use). Thus, the second upper and lower protrusions may be configured to bear against inner surfaces of the frames of the respective solar modules.

In a second aspect there is provided a spacer for spacing two adjacent stacked solar modules, the spacer comprising:
  a body having spaced opposed first and second edges, the body comprising an upper contact surface for contact with an upper solar module, and a lower contact surface for contact with a lower solar module;
  a first lower protrusion (e.g. arranged to bear against a frame of the lower solar module) protruding downwardly from or proximate to the first edge of the body to a free end of the first lower protrusion; and
  a second lower protrusion (e.g. arranged to bear against a frame of the lower solar module) protruding downwardly from the body to a free end of the second lower protrusion, the second lower protrusion spaced from the first lower protrusion in a direction towards the second edge of the body such that a space is defined between the first and second lower protrusions for receipt of a frame of the lower solar module;

wherein each of the first and second lower protrusions comprises an inwardly facing surface, and at least one of the inwardly facing surfaces is in the form of a guide surface configured to guide the frame of the lower solar module into the space defined between the first and second lower protrusions.

The spacer may comprise an upper protrusion (e.g. a first upper protrusion) arranged to bear against a frame of the upper solar module. The upper protrusion may protrude upwardly from or proximate to the first edge of the body to a free end of the upper protrusion.

The spacer of the second aspect may otherwise be as described above with respect to the first aspect. For example, the first lower protrusion may be offset from the upper protrusion in a direction along the first edge. The spacer may alternatively or additionally comprise any of the optional features described above with respect to the second aspect.

In a third aspect there is provided a solar module assembly, the solar module assembly comprising:

a spacer as described above with respect to the first aspect or the second aspect;

a lower solar module comprising a frame extending about a periphery of an assembly of solar cells, a portion of the frame of the lower solar module bearing against the lower contact surface of the spacer (and, e.g. the first lower protrusion and/or the second lower protrusion); and an upper solar module comprising a frame extending about a periphery of an assembly of solar cells, a portion of the frame of the upper solar module bearing against upper contact surface of the spacer (and, e.g. the first upper protrusion and/or the second upper protrusion).

The upper and lower solar modules may be as described above with respect to the first and second aspects.

In a fourth aspect there is provided an automated method of stacking solar modules, the method comprising:

lowering, by way of an automated handling device, a spacer as described in the first or second aspect onto a lower solar module, such that a frame of the lower solar module bears against the lower contact surface of the spacer (and, e.g. the first lower protrusion and/or the second lower protrusion); and positioning an upper solar module on the spacer such that a frame of the upper solar module bears against the upper contact surface of the spacer (and, e.g. the first upper protrusion and/or the second upper protrusion).

The method may comprise, prior to lowering the spacer, aligning the spacer (e.g. using the automated handling device) above the frame of the lower solar module.

The method may further comprise feeding (e.g. by way of an automated feeder) the spacer to the automated handling device.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1A:
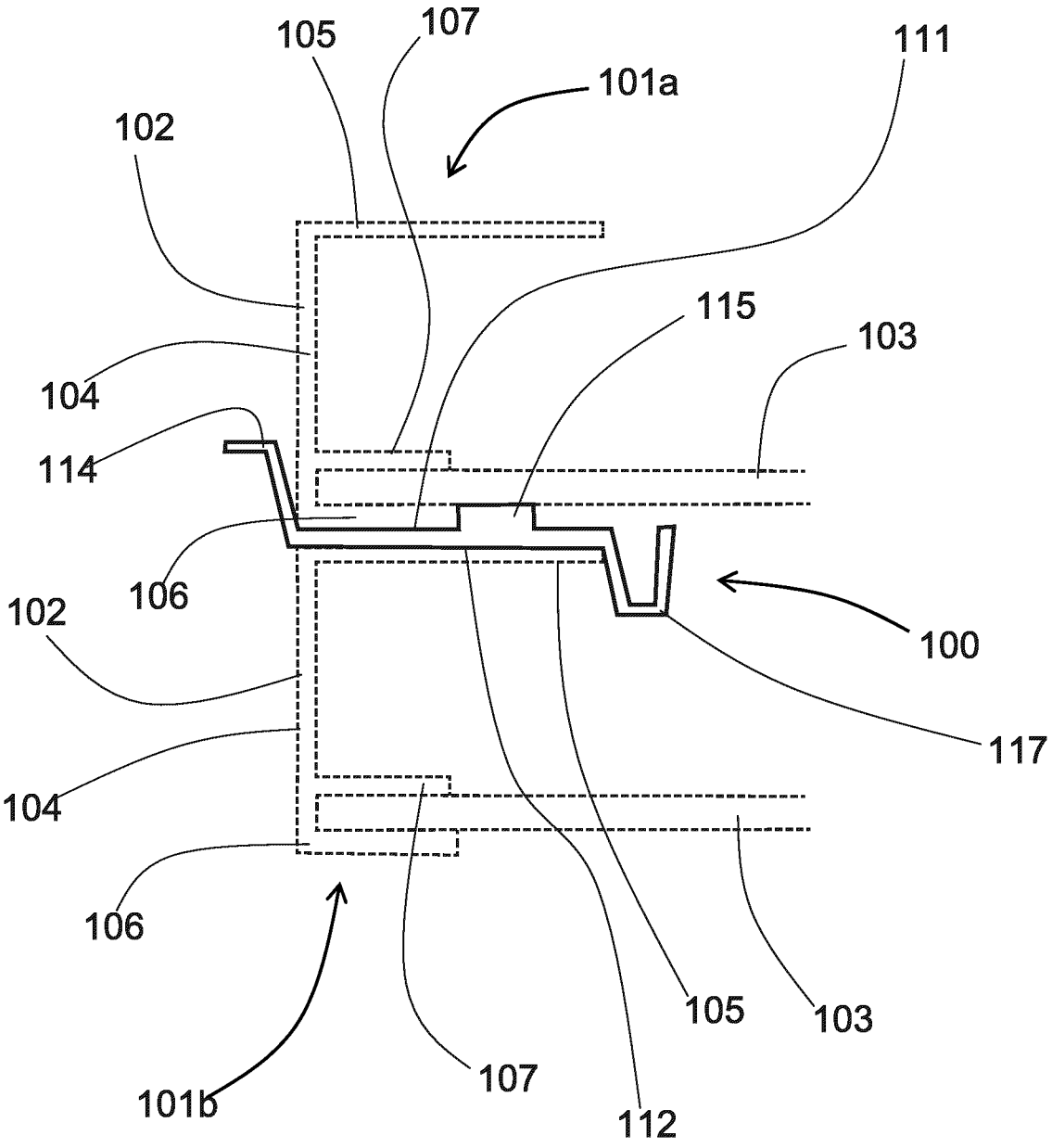
FIG. 1A is a schematic section view illustrating a spacer of a first embodiment spacing two adjacent solar modules.
Figure 1B:
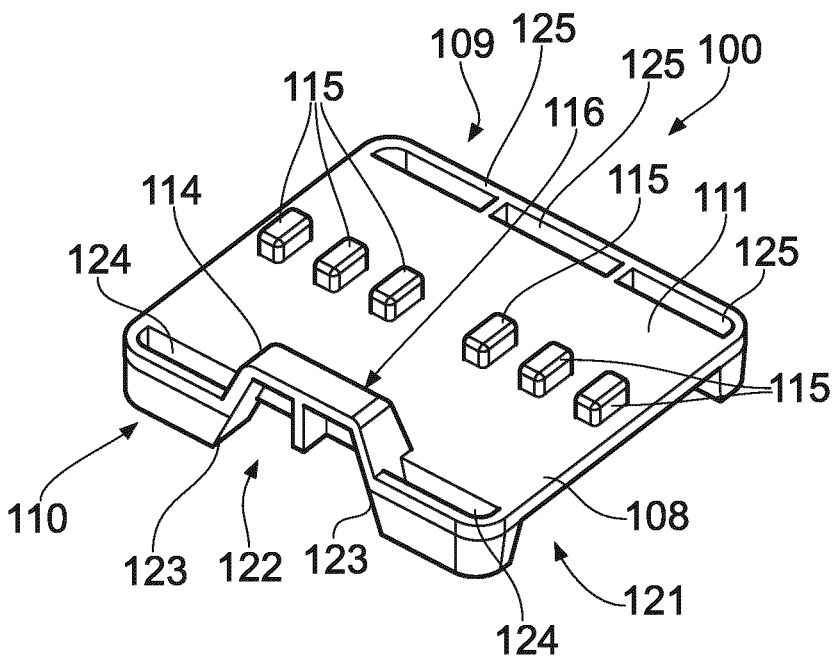
FIG. 1B is a top perspective view of the spacer of the first embodiment.
Figure 1C:
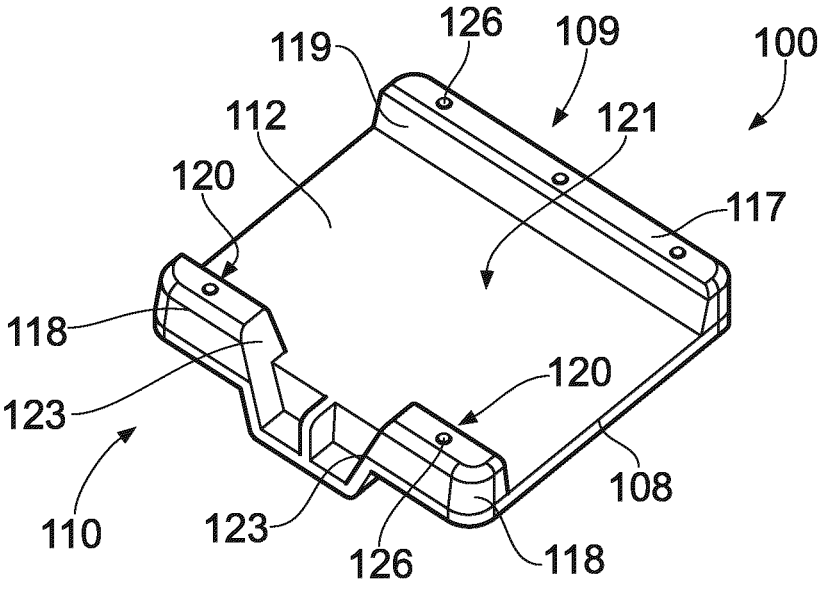
FIG. 1C is a bottom perspective view of the spacer of the first embodiment.

FIGS. 1A, 1B and 1C illustrate a spacer 100 for spacing two adjacent stacked solar modules 101a, 101b (shown in FIG. 1A). Each solar module 101a, 101b includes a frame 102 that extends about a periphery of (and retains the edge of) a solar cell assembly 103. Although not shown, the solar cell assembly 103 comprises an array of solar cells arranged between a back layer and a front glass layer. Both solar modules 101a, 101b, are illustrated with their respective glass layers facing downwards.

Each frame 102 is formed of a side wall 104 and three flanges 105, 106, 107 that extend inwardly from the side wall 104. In particular, each frame 102 includes an upper flange 105 at an upper end of the side wall 104, a lower flange 106 at a lower end of the side wall 104, and an intermediate flange 107 between the upper 105 and lower 106 flanges. The edge of the solar cell assembly 103 is received (and retained) between the lower 106 and intermediate 107 flanges.

The spacer 100 comprises a planar horizontal body 108 having spaced opposed first 110 and second 109 linear edges. The body 108 includes a planar upper contact surface 111 for contact with an upper solar module 101a of the two solar modules 101a, 101b, and a planar lower contact surface 112 for contact with a lower solar module 101b of the two solar modules 101a, 101b.

The spacer 100 further includes a first upper protrusion 114 protruding upwardly from the first edge 110 of the body 108 to a free end, and six cuboid-shaped second upper protrusions 115 that also protrude upwardly from the body 108. The second upper protrusions 115 are spaced from the first upper protrusion 114 in a direction towards the second edge 109, and are arranged so as to be spaced along a linear path that is parallel to and located between the first 110 and second 109 edges of the body 108. In this way, a space is defined between the first 114 and second 115 upper protrusions for receipt of a portion of the upper solar module 101a.

In particular, and as is shown in FIG. 1A, the lower flange 106 of the frame 102 of the upper solar module 101 is received and retained in the space between the upper protrusions 114, 115 (such that the side wall 104 bears against a lower end of the first upper protrusion 114). As is also evident from FIG. 1A, the height of each second upper protrusion 115 is the same as the thickness of the lower flange 106. The result of this is that the solar cell assembly 103 (and in particular, the protective glass layer) of the upper solar module 101a rests on distal end surfaces of the second upper protrusions 115.

To facilitate receipt of the lower flange 106 between the upper protrusions 114, 115, the first upper protrusion 114 comprises an inwardly facing surface in the form of a guide surface 116.

The guide surface 116 slopes upwardly and outwardly from upper contact surface 111 of the body 108. When using the spacer 100, this means that the lower flange 106 of the upper solar module 101a can be guided into the space between the upper protrusions 114, 115 by the guide surface 116 (i.e. as the solar module 101a is lowered onto the spacer 100). Accordingly, the spacer 100 accommodates some misalignment of the upper solar module 101a with the spacer 100 during engagement therewith.

The spacer 100 further comprises two first lower protrusions 118 and an elongate second lower protrusion 117. The second lower protrusion 117 protrudes downwardly from the second edge 109 of the body 108 to a free end and extends along the second edge 109 for the length of the second edge 109.

The two first lower protrusions 118 are both offset from the first upper protrusion 114 along the first edge 110. Both of the first lower protrusions 118 protrude downwardly from the first edge 110 of the body 108 to respective free ends thereof and are spaced from one another along the first edge 110 (the upper protrusion 114 arranged directly above this space between the first lower protrusions 118). Each of the first lower protrusions 118 is hollow and is formed of a wall surrounding an open-topped cavity 124. The second lower protrusion 117 is also hollow and is formed of a surrounding wall defining a cavity that is divided into three cavity portions 125 by two transverse dividing walls. The walls defining the lower protrusions 117, 118 may be used, for example, by a handling device to grip the spacer 100 in use. The provision of cavities/cavity portions 124, 125 also helps to minimise the weight and material requirements of the spacer 100.

Each cavity 124 and cavity portion 125 comprises a corresponding aperture 126 formed at a lower end thereof (i.e. formed in a lower end of the corresponding lower protrusion 117, 118). These apertures 126 permit water flow from the cavities/cavity portions 124, 125, and also prevent a vacuum being formed when the spacer 100 is stacked with a like-spacer (by providing a path for air to flow between the spacers 100).

The second lower protrusion 117 comprises an inwardly facing surface 119 that faces corresponding inwardly facing surfaces 120 of the two first lower protrusions 118. Together, these surfaces 119, 120 define a channel 121 for receipt of a portion of the lower solar module 101b (as depicted in FIG. 1A). In particular, this channel 121 receives the upper flange 105 of the frame 102 of the lower solar module 101b.

In practice (when the spacer 100 is used in a vertical stack of solar modules), the spacer 100 is placed onto the frame 102 of the lower solar module 101b. To aid in this placement, the inwardly facing surfaces, 120 119 of the lower protrusions 117, 118 are configured as guide surfaces. Thus, they are sloped with respect to the lower contact surface 112 of the body 108. In particular, each of these inwardly facing surfaces 119, 120 is sloped downwardly and outwardly (i.e. away from a centre of the channel 121). As a result, the channel 121 is wider (in a direction extending between the first 110 and second 109 edges) at its lower open end than at its base (defined by the lower contact surface 112).

Accordingly, when the spacer 100 is positioned over the upper flange 105 of the lower solar module 101b, it is guided onto the upper flange 105 by way of the sloped inwardly facing (guide) surfaces 119, 120. In this way, the sloped inwardly facing (guide) surfaces 119, 120 allow for some initial misalignment between the channel 121 and the upper flange 105. This facilitates positioning of the spacer 100 via an automated process, which may require larger tolerances than manual positioning of the spacer 100.

The spacer 100 further comprises a recess 122 that is defined between the two spaced first lower protrusions 118. This recess 122 is positioned directly below the outer upper protrusion 114 and is thus arranged to accommodate a portion of the outer upper protrusion of a like-spacer (not illustrated) when the spacer 100 is stacked on top of the like-spacer.

As should be apparent from the figures, when stacked in this manner, the (lower) free ends of the lower protrusions 117, 118 of the spacer 100 rest on the upper contact surface of the like-spacer. All of the lower protrusions 117, 118 have the same height (i.e. extend from the lower contact surface 112 to the same extent), such that when the spacer 100 is stacked on top of the like-spacer, the bodies 108 of the two spacers 100 are substantially parallel to one another. As may be appreciated, this arrangement means that when many spacers 100 are stacked on top of one another, the stack forms a vertically extending column. As such, the stacked spacers 100 can be more easily accommodated in, for example, a feeder of a handling device.

To further aid in stacking of the spacer 100 (with other like-spacers), both the first upper protrusion 114 and the recess 122 are tapered inwardly (i.e. narrow) in an upward direction (i.e. each having a substantially trapezoidal shape). That is, both the first upper protrusion 114 and the recess 122 are wider (taken in a direction along the first edge 110) at their lower ends than at their upper ends. The recess 122 is, in particular, defined between two sloped side surfaces 123 of the spaced first lower protrusions 118.

As may be appreciated, the spacer 100 of FIGS. 1A-1C is configured for receipt between linear portions (i.e. between corners) of the respective frames 102 of the upper 101a and lower 101b solar modules.

Figure 2A:
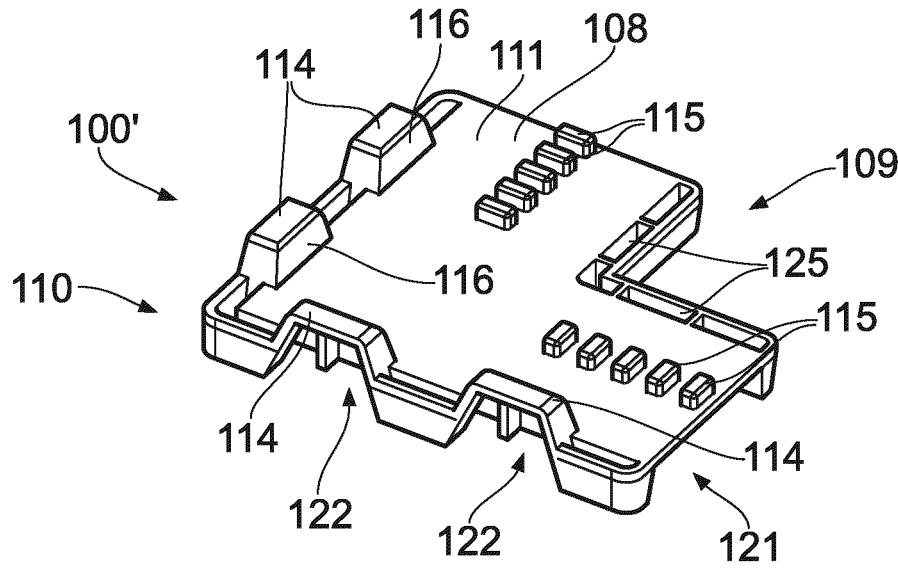
FIG. 2A is a top perspective view of a spacer according to a second embodiment.
Figure 2B:
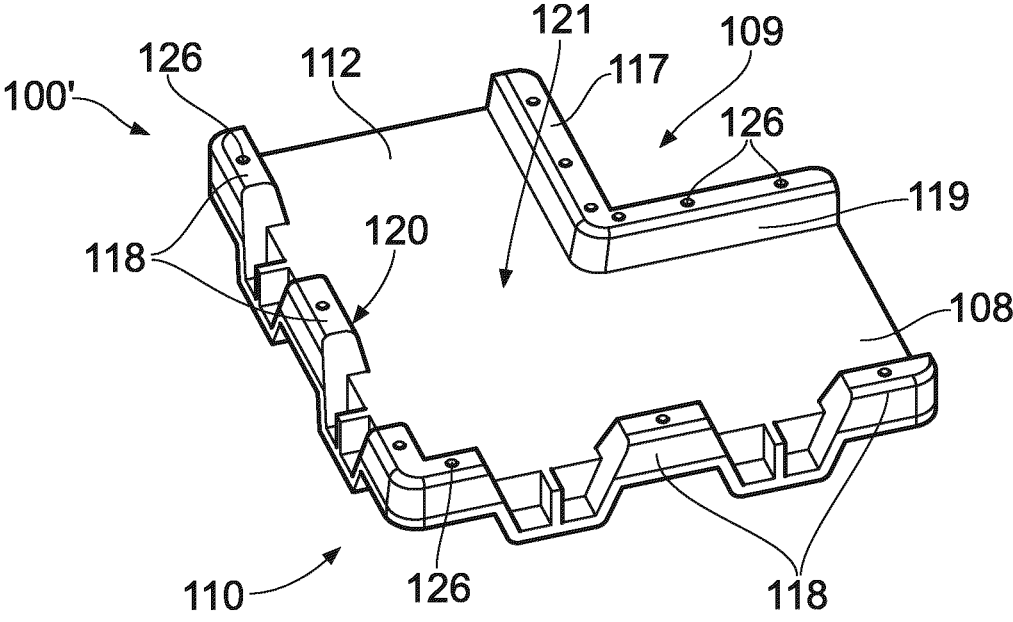
FIG. 2B is a bottom view of the spacer of the second embodiment.

FIGS. 2A and 2B illustrate a spacer 100' that is configured for spacing the corners of the frames 102 of the solar modules 101a, 101b from one another. This spacer 100' includes many of the features of the spacer 100 of FIGS. 1A-1C and, for that reason, the same reference numerals have been used.

This spacer 100' differs from that previously described in that the body 108 is shaped to accommodate the corners of two solar module frames. Thus, the body 108 is L-shaped and has first 110 and second 109 spaced opposed edges that each follow an L-shaped or corner-shaped path. A result of this is that the second lower protrusion 117 (which extends along the second edge 109) and the channel 121 (defined partly by the second lower protrusion) are also L-shaped. This allows the channel 121 to accommodate the corner of the frame 102.

The spacer 100' also includes a greater number of first upper 114 and lower 118 protrusions than the spacer 100 discussed above. In particular, the spacer 100' comprises four first upper protrusions 114 spaced along the first edge 110, and five first lower protrusions 118 that are also spaced along the first edge 110. The first upper protrusions 114 and first lower protrusions 118 are offset from one another so as to be arranged in an alternating pattern along the first edge 110 (i.e. so as to form a corrugated structure at the first edge 110). Each pair of first lower protrusions 118 defines a tapered recess 122 therebetween for receipt of a corresponding first upper protrusion of a like-spacer when the spacer is stacked on the like spacer. In this way, the first lower protrusions 118 are configured to interdigitate with first upper protrusions of a like-spacer when the spacer is stacked on top of the like-spacer.

The spacer 100' also includes a larger number of second upper protrusions 115 than the spacer 100 described above. In particular, the spacer 100' comprises two groups of second upper protrusions 115. Each group of second upper protrusions 115 is arranged on a respective leg of the L-shaped body 108 and includes five second upper protrusions 115 spaced from one another along a linear path that is L-shaped and that is parallel to (but spaced from) the second edge 109.

This arrangement of second upper protrusions 115 results in a space defined between the first and second upper protrusions 115 that is shaped for receipt of the corner of a solar module frame (i.e. is L-shaped).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A spacer for spacing two adjacent stacked solar modules, the spacer comprising:
   a body having spaced opposed first and second edges, the body comprising an upper contact surface for contact with an upper solar module, and a lower contact surface for contact with a lower solar module;
   a first upper protrusion arranged to bear against a frame of the upper solar module, the first upper protrusion protruding upwardly from or proximate to the first edge of the body to a free end of the first upper protrusion;
   a first lower protrusion arranged to bear against a frame of the lower solar module, the first lower protrusion protruding downwardly from or proximate to the first edge of the body to a free end of the first lower protrusion, the first lower protrusion offset from the first upper protrusion in a direction along the first edge,
   a second upper protrusion spaced from the first upper protrusion in a direction towards the second edge such that a space is defined between the first and second upper protrusions for receipt of a frame of the upper solar module; and
   a second lower protrusion protruding downwardly from the body to a free end, the second lower protrusion spaced from the first lower protrusion in a direction towards the second edge of the body such that a space is defined between the first and second lower protrusions for receipt of a frame of the lower solar module.

2. A spacer according to claim 1 wherein each of the first and second lower protrusions comprises an inwardly facing surface, and at least one of the inwardly facing surfaces is in the form of a guide surface configured to guide the frame of the lower solar module into the space defined between the first and second lower protrusions.

3. A spacer according to claim 2 wherein the guide surface is sloped in a downward and outward direction.

4. A spacer according to claim 1, wherein the height of the first lower protrusion from the lower contact surface is substantially the same as the height of the second lower protrusion from the lower contact surface.

5. A spacer according to claim 1 comprising a recess arranged to accommodate the first upper protrusion or the first lower protrusion of a like-spacer when the spacer is stacked with the like-spacer.

6. A spacer according to claim 5 wherein:
   when the recess is arranged to accommodate the first upper protrusion of the like-spacer, the recess is vertically aligned below the first upper protrusion of the spacer; and
   when the recess is arranged to accommodate the first lower protrusion of the like-spacer, the recess is vertically aligned above the first lower protrusion of the spacer.

7. A spacer according to claim 5, wherein the recess tapers inwardly in a direction of receipt of the protrusion of the like-spacer in use.

8. A spacer according to claim 5, wherein the recess is partly defined by the first upper protrusion or the first lower protrusion.

9. A spacer according to claim 5 wherein:
   the spacer comprises two first upper protrusions and the recess is defined between the two first upper protrusions; or
   the spacer comprises two first lower protrusions and the recess is defined between the two first lower protrusions.

10. A spacer according to claim 1, wherein the first upper protrusion or the first lower protrusion is tapered inwardly from a proximal end to the free end thereof.

11. A spacer according to claim 1 comprising a plurality of first upper protrusions spaced along the first edge and a plurality of first lower protrusions spaced along the first edge, the first upper protrusions and first lower protrusions arranged along the first edge in an alternating pattern.

12. A spacer according to claim 1, wherein the spacing between the first and second upper protrusions is smaller than the spacing between the first and second lower protrusions.

13. A spacer according to claim 1, wherein the height of the second upper protrusion is smaller than the height of the or each first upper protrusion.

14. A spacer according to claim 1 comprising a plurality of second upper protrusions spaced along a path that is substantially parallel to the first edge.

15. A spacer according to claim 1, wherein at least one of the first and second lower protrusions comprises an open-topped cavity.

16. A spacer according to claim 15 comprising an aperture for fluid flow therethrough from above the spacer to below the spacer.

17. A spacer according to claim 16, when the aperture is arranged to provide fluid flow from the open-topped cavity.

18. A spacer according to claim 1 that is integrally formed.

19. A spacer according to claim 1 that is configured for receipt between a linear portion of a frame of the upper solar module and a linear portion of a frame of the lower solar module.

20. A spacer according to claim 1 that is configured for receipt between a corner portion of a frame of the upper solar module and a corner portion of a frame of the lower solar module.

21. A spacer for spacing two adjacent stacked solar modules, the spacer comprising:
   a body having spaced opposed first and second edges, the body comprising an upper contact surface for contact with an upper solar module, and a lower contact surface for contact with a lower solar module;

a first lower protrusion protruding downwardly from or proximate to the first edge of the body to a free end of the first lower protrusion;

a second lower protrusion protruding downwardly from the body to a free end of the second lower protrusion, the second lower protrusion spaced from the first lower protrusion in a direction towards the second edge of the body such that a space is defined between the first and second lower protrusions for receipt of a frame of the lower solar module;

a first upper protrusion arranged to bear against a frame of the upper solar module, the upper protrusion protruding upwardly from or proximate to the first edge of t e body to a free end of the upper protrusion;

a second upper protrusion spaced from the first per protrusion in a direction towards the second edge such that a space is defined between the first and second upper protrusions for receipt of a frame of the r sol nodule; and wherein each of the first and second lower protrusions comprises an inwardly facing surface, and at least one of the inwardly facing surfaces is in the form of a guide surface configured to guide the frame of the lower solar module into the space defined between the first and second lower protrusions.

22. A solar module assembly, the solar module assembly comprising:

a spacer according to any one of the preceding claims;

a lower solar module comprising a frame extending about a periphery of an assembly of solar cells, a portion of the frame of the lower solar module bearing against the lower contact surface of the spacer; and an upper solar module comprising a frame extending about a periphery of an assembly of solar cells, a portion of the frame of the upper solar module bearing against the upper contact surface of the spacer.

23. An automated method of stacking solar modules, the method comprising:

lowering, by way of an automated handling device, a spacer according to claim 1 onto a lower solar module, such that a frame of the lower solar module bears against the lower contact surface of the spacer; and positioning an upper solar module on the spacer such that a frame of the upper solar module bears against the upper contact surface of the spacer.

24. A spacer for spacing two adjacent stacked solar modules, the spacer comprising:

a body having spaced opposed first and second edges, the body comprising an upper contact surface for contact with an upper solar module, and a lower contact surface for contact with a lower solar module;

a first upper protrusion arranged to bear against a frame of the upper solar module, the first upper protrusion protruding upwardly from or proximate to the first edge of the body to a free end of the first upper protrusion;

a first lower protrusion arranged to bear against a frame of the lower solar module, the first lower protrusion protruding downwardly from or proximate to the first edge of the body to a free end of the first lower protrusion, the first lower protrusion offset from the first upper protrusion in a direction along the first edge; and a plurality of first upper protrusions spaced along the first edge and a plurality of first lower protrusions spaced along the first edge, the first upper protrusions and first lower protrusions arranged along the first edge in an alternating pattern.

* * * * *